March 24, 1970     A. P. SHLOSINGER     3,502,138

MEANS FOR REGULATING THERMAL ENERGY TRANSFER THROUGH A HEAT PIPE

Filed Aug. 14, 1967

INVENTOR.
ARNOLD P. SHLOSINGER

BY

ATTORNEY

United States Patent Office 3,502,138
Patented Mar. 24, 1970

3,502,138
MEANS FOR REGULATING THERMAL ENERGY TRANSFER THROUGH A HEAT PIPE
Arnold P. Shlosinger, Los Angeles, Calif., assignor to TRW Inc., Redondo Beach, Calif., a corporation of Ohio
Filed Aug. 14, 1967, Ser. No. 660,400
Int. Cl. G05d 23/00; F28d 15/00; F25b 19/00
U.S. Cl. 165—32      1 Claim

ABSTRACT OF THE DISCLOSURE

A method of and means for regulating the rate of thermal energy transfer through a heat pipe containing a heat transfer fluid in its liquid and vapor phase by regulating the pressure at the liquid-vapor interface. A regulated thermal generator embodying thermally regulated heat pipe means for transmitting thermal energy at a controlled rate to a heat sink or thermal load.

BACKGROUND OF THE INVENTION

Field of the invention

This invention relates generally to heat transfer devices or heat exchangers of the class which are commonly referred to as heat pipes. More particularly, the invention relates to a method of and means for regulating the rate of thermal energy transfer through a heat pipe. The invention relates also to a thermal generator embodying thermally regulater heat pipe means for transmitting thermal energy at a controlled rate to a heat sink or thermal load.

Prior art

Among the existing techniques for transferring thermal energy from a thermal source to a heat sink or thermal load are those involving the use of thermal conduction and forced convection heat transfer systems and heat pipes. A degree of heat transfer regulation has been achieved in thermal conduction systems by the employment of thermal switching means, such as mechanical contact devices, which are introduced into the thermal energy flow path and thermally conductive fluids which may be selectively introduced into and removed from heat transfer relation to the thermal energy flow path. Forced convection heat transfer systems, on the other hand, commonly utilize a circulating liquid, pumping means and appropriate valves, by-passes, and controls for diverting a portion of the liquid flow to effect thermal energy transfer regulation. The existing regulated thermal conduction systems are characterized by limited thermal conductance which is dependent upon the thermal characteristics of the materials employed in the systems and the contact resistance of the thermal switching devices. Forced convection heat transfer systems, on the other hand, while permitting relatively high thermal energy transfer rates and relatively compact system geometries, require a number of mechanical devices, such as pumps, valves, and expansion tanks, and, in addition, an electrical power source for driving the pumps. As a consequence these systems are characterized by excessive size, weight, cost and complexity. While heat pipes provide a relatively simple, low-cost, light weight, compact and efficient means of thermal energy transfer, the existing heat pipes are defficient for the reason that they lack the capability of thermal energy transfer regulation. Typical prior art heat pipe configurations, for example, are disclosed in Patents No. 3,152,744; 3,229,759; 2,779,143; and 3,018,087.

SUMMARY OF THE INVENTION

One aspect of the present invention is concerned with a heat pipe embodying control means for regulating the rate of thermal energy transfer through the pipe. According to this aspect, the invention provides a heat pipe containing a heat transfer fluid which exists in both its liquid and vapor phase and undergoes a closed thermodynamic cycle involving vaporization or boiling of the liquid fluid in the heat input or evaporator section of the heat pipe, flow of the resulting fluid vapor to the heat output or condenser section of the pipe, condensation of the fluid within the condenser section, and capillary flow of the liquid condensate from the condenser section back to the evaporator section to repeat the cycle. The rate of thermal energy transfer through the heat pipe is regulater by regulating the pressure of one fluid phase to control the temperature at which the heat transfer fluid boils or condenses within the pipe. According to one disclosed practice of the invention, for example, the pressure of the vapor phase in either the evaporator section or the condenser section is regulated to regulate thermal energy transfer. In this case, the heat pipe is equipped with a movable pressure wall which bounds a portion of the vapor space of the respective heat pipe section, and is positioned in response to the vapor pressure and an opposing control pressure in such a way as to effect regulation of the vapor pressure. According to an alternative disclosed practice of the invention, the liquid surface pressure is directly regulated to regulate thermal energy transfer. In this case, the heat pipe is equipped with a pressure wall for directly contacting and pressurizing the face of the liquid within the capillary flow path of the heat pipe in response to a control fluid or spring pressure. The heat transfer regulating means of the heat pipe may be operated in such a way as to either regulate the rate of thermal energy transferred through the pipe or maintain at constant temperature at either the heat input or heat rejection end of the pipe under varying thermal flow rate conditions.

A second aspect of the invention is concerned with a thermal generator utilizing thermally regulated heat pipe means according to the invention for transmitting thermal energy at a controlled rate to a heat sink or thermal load. According to this aspect, a thermally regulated heat pipe according to the invention is interposed between a heat source and the heat sing or load whereby thermal energy transfer from the source to the load occurs through the heat pipe and may thus be regulated. In some cases, a second thermally regulater heat pipe of the invention may be utilized to transfer a waste portion of the thermal energy from the heat source to a heat sink. An important feature of this inventive aspect resides in the fact that the generator may employ a non-controllable heat source, such as an isotope heat source.

DESCRIPTION OF THE PREFERRED EMBODIMENTS

Figure 1:
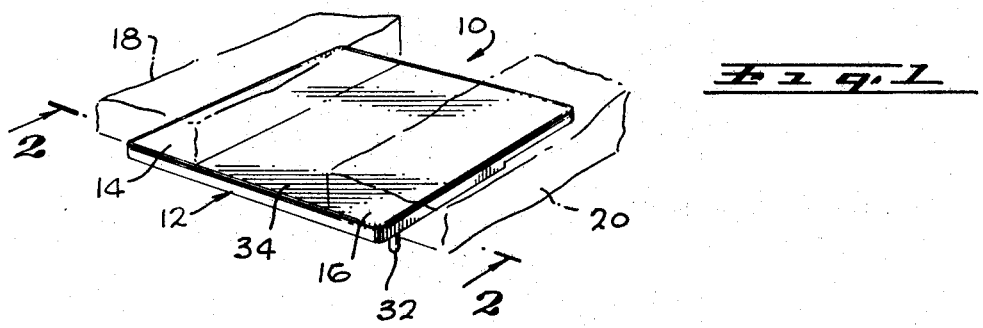
FIG. 1 is a perspective view of a regulated heat pipe according to the invention.

As noted earlier, one aspect of the invention is concerned with a heat pipe for effecting controlled transfer of thermal energy from a heat source to a heat sink or thermal load. In general terms, this heat pipe, represented in FIGS. 1 and 2 by the heat pipe 10, is characterized by a casing 12 having thermally conductive evaporator and condenser wall sections 14 and 16 at the heat input and heat rejection ends, respectively, of the heat pipe. During operation of the heat pipe, the evaporator wall section 14 is disposed in heat transfer relation to a heat source 18 and the condenser wall section 16 is disposed in heat transfer relation to a heat sink or thermal load 20. The heat pipe casing 12 defines interior evaporator and condenser regions 22, 24 adjacent and disposed in heat transfer relation to the evaporator and condenser wall sections 14, 16, respectively, and an interior vapor flow path 26 communicating these regions. Extending through the interior of the casing, between and defining a liquid flow path communicating the evaporator and condenser regions 22, 24 are capillary means 28 which are disposed in heat transfer relation to the evaporator and condenser wall sections 14, 16.

The heat pipe is conditioned for operation by evacuating the pipe to remove all air or other non-condensible gases from the pipe and then introducing into the interior of the pipe a quantity of liquid heat transfer fluid, such as water, for saturating the capillary means 28. When thus conditioned for operation, the heat pipe will contain heat transfer fluid in both its liquid and vapor phases under a condition of thermodynamic equilibrium. During operation of the heat pipe, thermal energy is transferred through the pipe from the source 18 to the sink or load 20 by a closed thermodynamic cycle involving vaporization or boiling of the liquid heat transfer fluid within the evaporator region 22 of the pipe by absorption of thermal energy from the heat source, flow of the resulting vapor from the evaporator region to the condenser region 24 through the vapor flow path 26, condensation of the fluid vapor within the condenser region by rejection of its latent heat of vaporization to the heat sink or load, and capillary return flow of the liquid condensate from the condenser region to the evaporator region through the liquid flow path defined by the capillary means 28 to repeat the cycle.

The primary contribution of the present invention resides in control means 30 for regulating the pressure at the free surface of the liquid phase within the evaporator region 22 or the condenser region 24 of the heat pipe to regulate the rate of thermal energy transfer through the pipe. In the particular heat pipe 10 illustrated in FIGS. 1 and 2, for example, the vapor pressure in the evaporator region is regulated to regulate the liquid surface pressure and rate of heat transfer through the pipe. In a later described embodiment of the invention, the pressure at the free surface of the liquid phase is regulated directly by contact of a pressure wall with the surface. In each case, regulation of the liquid surface pressure is effective to control the boiling temperature or the condensing temperature, as the case may be, of the heat transfer fluid in the heat pipe, and thereby, the rate of thermal energy transfer through the pipe.

Figure 2:
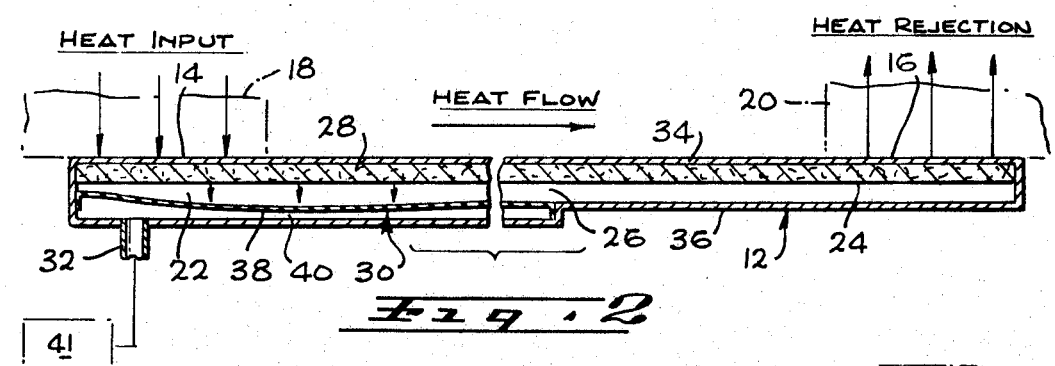
FIG. 2 is an enlarged transverse section through the heat pipe taken on line 2—2 in FIG. 1.

Referring now in more detail to the heat pipe 10 of the invention, which has been selected for illustration in FIGS. 1 and 2, the heat pipe casing 12 may be fabricated from sheet metal and is hermetically sealed except for a control pressure port 32. The particular casing shown has a generally flat rectangular shape and includes spaced and generally parallel planar sidewalls 34 and 36. It will be understood, however, that this particular heat pipe geometry is intended to be purely illustrative and that the shape of the heat pipe may be varied to suit each particular application. One end of the casing sidewall 34 defines the evaporator wall section 14 and the other end of this wall defines the condenser wall section 16.

Capillary means 28 comprises a relatively thin layer of capillary material which is disposed in good thermal contact with the inner surface of the casing sidewall 34. Preferably, this capillary layer covers the entire inner surface of the sidewall. The layer may be secured to the sidewall in any convenient way which provides minimum thermal resistance between the sidewall and the layer. Various capillary materials may be employed in the heat pipe, such as fine mesh or micronic wire screen, felt or the like.

In the particular heat pipe 10 under consideration, the thermal energy transfer control means 30 comprise a moveable pressure wall 38 which is sealed to the casing 12 in such a way that during operation of the heat pipe, one side of the wall is exposed to the vapor pressure within one of the regions 22, 24 of the heat pipe and the opposite side of the wall is exposed to a control fluid pressure which is applied to the heat pipe through the pressure port 32. The illustrated pressure wall 38, for example, comprises a thin flexible membrane which is disposed within the heat pipe casing 12, in a plane generally parallel to the casing sidewalls 34, 36 and is parametrically sealed to the casing walls so as to be exposed to the vapor pressure in the evaporator region 22. For relatively low temperature applications, this membrane may comprise an elastomer or plastic film. For relatively high temperature applications, which prohibit the use of such an elastomer or plastic film, the pressure wall may comprise a metallic diaphragm, a bellows, or a piston, depending upon the required operating temperature and/or the specific application of the heat pipe. In this connection, it will be understood that the geometry of the heat pipe casing 12 may be modified to accommodate the particular pressure wall which is employed. Referring to the particular heat pipe illustrated, it will be observed that the pressure wall or membrane 38 divides the interior of the heat pipe casing 12 into separate upper and lower chambers, as the pipe is viewed in the drawings. The upper chamber is a heat transfer chamber which defines the evaporator and the condenser regions 22, 24 and the vapor flow path 26 and contains the capillary means 28 of the heat pipe. The lower chamber 40 is a control pressure chamber which communicates with the pressure port 32.

The heat pipe 10 is conditioned for operation by evacuating the heat upper transfer chamber and then introducing into the chamber a quantity of heat transfer liquid, such as water, for saturating the capillary layer 28, such that the latter contained only the liquid heat transfer fluid and its vapor in thermodynamic equilibrium. During subsequent operation of the heat pipe, with the evaporator and condenser wall sections 14, 16 disposed in heat transfer relation to the heat source 18 and heat sink or thermal load 20, the heat transfer fluid within the heat transfer chamber undergoes the closed thermodynamic heat transfer cycle referred to earlier. It will be recalled that this thermodynamic cycle involves vaporization or boiling of the liquid heat transfer fluid within the evaporator region 22 by heat absorption from the heat source 18 through the evaporator wall section 14 of the heat pipe, flow of the resulting fluid vapor from the evaporator region to the condenser region 24 through the vapor flow path 26, condensation of the vapor within the condenser region by rejection of its latent heat of vaporization of the heat sink or thermal load 20 through the condenser wall section 16, and capillary return flow of the liquid condensate to the evaporator region through the capillary layer 28 to repeat the cycle. The driving force for inducing flow of the fluid vapor through the vapor flow path 26 from the evaporator region 22 to the condenser region 24 is furnished by the vapor pressure differential which exists between these regions by virtue of boiling of the liquid in the evaporator region and condensing of the vapor in the condenser region.

According to the present invention, the vapor pressure within the evaporator or the condenser region 22, 24 of the heat pipe is regulated to regulate the boiling or condensing temperature, as the case may be, of the heat transfer liquid within the respective region and thereby the rate of thermal energy transfer through the heat pipe, by regulating the fluid pressure in the control chamber 40 of the heat pipe. To this end, the control port 32 of the heat pipe communicates to a source 41 of control fluid pressure which may be the surrounding atmosphere or a control pressure signal generator. In the particular heat pipe illustrated, the vapor pressure within the evaporator region 22 is regulated to regulate thermal energy transfer. Thus, it is evident that when the control chamber 40 is pressurized, the vapor pressure within the evaporator region 22 of the heat pipe will be substantially balanced by and thereby substantially equal to the control pressure in the control chamber. Since the boiling point or temperature of the heat transfer liquid contained by the capillary layer 28 within the heat pipe evaporator region 22 is a function of the pressure, i.e., vapor pressure, active on the free surface of the liquid in this region, and this vapor pressure, in turn, is determined by the control pressure in the control chamber 40, the boiling temperature of the liquid may be regulated by regulating the control pressure. According to an alternative practice of the invention, the heat pipe may be arranged to regulate thermal energy transfer through the pipe by regulating the vapor pressure and thereby the condensing temperature of the heat transfer fluid with the condenser region 24. This is accomplished by locating the pressure wall or membrane 38 so that it bounds the condenser region rather than the evaporator region, as shown, and regulating the pressure in the control chamber 40. Obviously, the alternative heat pipe arrangement may be simply achieved by merely reversing the positions of the heat source 18 and heat sink 20 relative to the pipe.

The present heat pipe may be controlled in such a way as to regulate the rate of thermal energy transfer through the pipe or to maintain a constant temperature at either the heat input end or the heat rejection end of the heat pipe under varying thermal energy flow rates. For example, maintenance of a constant pressure in the control chamber 40 of the illustrated heat pipe, as by communication of the control port 32 to a source of constant control pressure, is effective to maintain a constant boiling temperature of the heat transfer liquid and hence a constant temperature at the heat input end of the heat pipe irrespective of the rate of heat inflow to the pipe. In this regard, it is evident that increasing rate of heat inflow to the pipe will tend to increase the vapor pressure within the heat input end of the heat pipe. This increased vapor pressure will deflect the pressure wall or membrane 38 outwardly against the constant pressure in the control chamber 40, thereby increasing the volume of the evaporator region 22 and reducing the vapor pressure in this region, until the vapor pressure and constant control pressure are again balanced, thus maintaining a constant boiling temperature. It will be understood, of course, that this balancing of the vapor and control pressures assumes a pressure wall configuration which introduces no extraneous force, such as an elastic stretching or deflection in the membrane, in opposition to either the vapor pressure or the control pressure. In the event that the movement or deflection of the pressure wall in response to the pressures thereacross does introduce such an extraneous force, the vapor pressure and control pressure will differ by an amount related to the force. Diminishing heat flow into the heat pipe will have the reverse effect of increasing the heat flow. Thus, a diminishing heat inflow will tend to reduce the vapor pressure in the evaporator region of the heat pipe. Under these conditions, the constant control pressure in the control chamber 40 will deflect the pressure wall or membrane 38 inwardly, thereby reducing the volume of the evaporator region and increasing the vapor pressure in the region, until the control and vapor pressures are again equalized, thus maintaining a constant boiling temperature. Maintenance of a constant temperature at the heat rejection end of the heat pipe is accomplished by rearranging the pipe in the manner explained above to regulate the vapor pressure in the condenser region 24 and communicating the control chamber 24 to a constant pressure source. It will now be understood, therefore, that the present heat pipe may be utilized to maintain a temperature-limited heat source, such as the human skin, at a desired constant temperature level by maintaining an appropriate constant fluid pressure in the control chamber 40 of the pipe. Obviously, the heat pipe also may be controlled to regulate the rate of heat flow or thermal energy transfer through the pipe, between a heat source and a heat sink or thermal load.

The thermally regulated heat pipe of the invention thus possesses all of the inherent advantages of a conventional heat pipe, to wit simplicity of construction, low cost, absence of moving parts, no electrical power requirements, light-weight, compact geometry, and high thermal energy transfer rates. The present invention adds to these inherent advantages the additional, highly important advantage of heat transfer regulation or control which may be utilized to maintain either a constant heat input temperature or a constant heat rejection temperature under varying heat flow rates, or to regulate the rate of thermal energy transfer between a heat source and a heat sink or thermal load in response to an external control signal, in this instance, a pneumatic signal. In this latter regard, it will be evident that the moveable pressure wall or membrane 38 may be yieldable biased in opposition to the vapor pressure in the heat transfer chamber of the heat pipe by means other than a pneumatic control pressure, such as a spring or a mechanical or electromechanical actuator operating through a spring. A number of specific and highly useful applications of the present heat pipe will now be evident to those skilled in the art. Among these useful applications, for example, are transfer of metabolic heat in a space suit from the wearer's skin to the external surface of the suit or a radiator or water boiler, transfer of heat from any heat source, such as electronic equipment or power generating equipment, to a heat sink, and controlled transfer of heat from an uncontrollable heat source, such as an isotope heat source, to a thermal load.

Figures 3, 4:
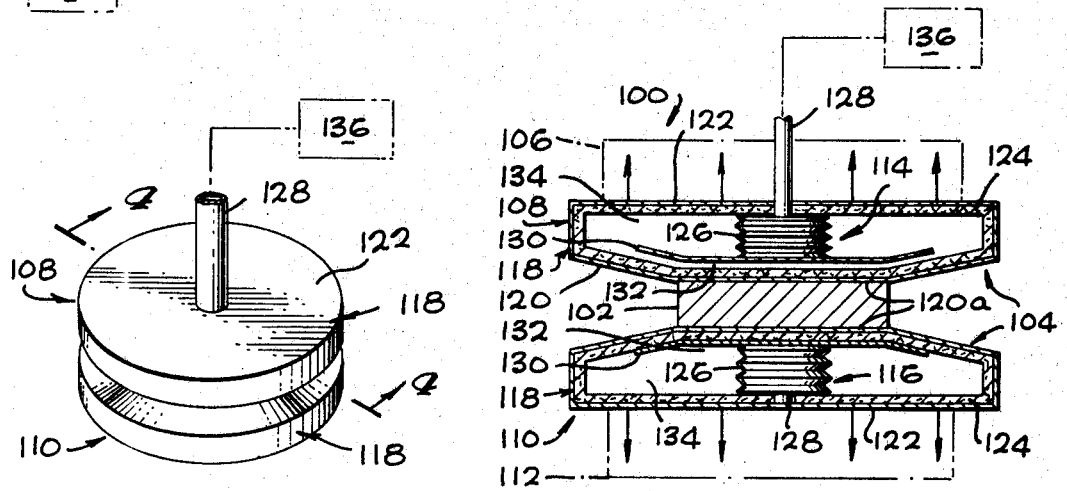
FIG. 3 is a perspective view of a thermal generator according to the invention.
FIG. 4 is an enlarged transverse section through the heat pipe taken on line 4—4 in FIG. 3.

In this latter regard, it will be recalled that a further aspect of the present invention is concerned with a thermal generator utilizing an uncontrollable heat source, such as an isotope heat source, and thermally regulated heat pipe means according to the invention for effective transfer of heat from the source to a thermal load or heat sink at a controlled rate. FIGS. 3 and 4 illustrate a regulated thermal generator 100 of this type. In general terms, the generator comprises a heat source 102 and heat pipe means 104 for effecting controlled heat transfer from the source to a thermal load 106 for the purpose of heating the latter to a desired temperature. Insofar as the present invention is concerned, the heat source 102 may comprise any convenient or suitable heat source. However, the primary advantage of the invention resides in the fact that it permits controlled heating of a thermal load by a normally uncontrollable heat source, such as an isotope heat source.

In the particular thermal generator 100 illustrated in the drawings, the heat pipe means 104 for effecting controlled heat transfer from the heat source 102 to the thermal load 106 comprise a pair of regulated heat pipes 108 and 110 according to the invention. Heat pipe 110 is utilized to dissipate or reject excess or waste heat from the source to a suitable heat sink 112. At this point, it is significant to recall that in the first described embodiment of the invention, the rate of thermal energy transfer through the heat pipe is regulated by regulating the pressure of the vapor phase of the heat transfer fluid contained within the pipe. In the heat pipes 108 and 110 embodied in the thermal generator 100, the rate of thermal energy transfer is regulated by directly regulating the pressure at the free surface of the liquid phase of the heat transfer fluid. To this end, the heat pipes are equipped with thermal energy transfer control means 114 and 116, respectively, which are effective to pressurize the free interface or surface of the liquid in the capillary means or layers of the pipes and thereby regulate the boiling temperature of the liquid and the rate of heat transfer through the pipes.

Referring now in greater detail to the illustrated thermal generator 100, the heat pipe 108 will be seen to comprise a generally flat hermetic casing 118 having spaced sidewalls 120, 122. As already noted, the geometry of the present heat pipe may be widely varied, depending upon its particular application. In the drawings, it is assumed that the heat source 102 comprises a disk shaped isotope heat capsule. In this case, the heat pipe casing 118 preferably also has a generally cylindrical disk-like shape and the casing sidewall 120 adjacent to the heat source has the shape of truncated cone. The central flat portion 102a of the casing wall 120, defines the heat input or evaporator section of the casing. This evaporator section is designed to be placed in good thermal relation or contact with one side of the heat source 102 and preferably has about the same diameter as the heat source. The opposite wall 122 of the heat pipe casing 118 defines the heat rejection or condenser wall section of the casing. Within the heat pipe casing 118 are capillary means 124. As in the previous form of the invention, this capillary means may comprise a relatively thin layer of capillary material, such as felt, fine mesh or micronic wire screen, or the like, which is disposed in effective thermal contact with and secured to the inner surface area of the casing.

The thermal energy transfer control means 114 of the heat pipe 108 comprises a moveable pressure wall 126 in the form of a bellows which is concentrically disposed within the heat pipe casing 118 and defines an interior control pressure chamber. One end of this bellows is secured to the condenser wall section 122 of the casing. Leading from this end of the bellows, through the latter wall section, to the exterior of the casing, is a conduit defining a control pressure port 128. This pressure port communicates to the interior control chamber of the bellows. The opposite end of the bellows is closed. Secured to the closed end of the bellows is a moveable baffle or pressure wall member 130. This wall member is designed to press against the confronting capillary layer 124 which is secured to the evaporator wall 120 of the heat pipe casing 118 and, to this end, is provided with a shape which complements the confronting surface of the capillary layer, as illustrated in the drawings.

The heat pipe 110, except for the heat transfer control means 116, is similar to the heat pipe just described. Accordingly, a detailed description of the heat pipe 110 is unnecessary and the corresponding elements of the heat pipes are designated by the same reference numerals. Sufficient to say, that the only difference between the two heat pipes resides in the fact that the control port 128 of the heat pipe 110 communicates to a control pressure source. Alternatively, the bellows 126 of the heat pipe 110 may be evacuated, sealed, and provided with an internal spring in lieu of communication to a control pressure source. The evaporator section 120 of the heat pipe 110 is disposed in effective thermal contact with the side of the heat source 102 remote from the heat pipe 108.

The thermal generator 100 is conditioned for operation by introducing into the heat pipes 108, 110 a quantity of liquid heat transfer fluid and its vapor for saturating the capillary layers 124 in the pipes, as discussed earleir in connection with the first embodiment of the invention. During actual operation of the generator, the thermal load 106 to be heated is placed in heat transfer relation to the condenser wall section 122 of the heat pipe 108 and the heat sink 112 is placed in heat transfer relation relative to the condenser wall section 122 of the heat pipe 110. Under these condition, the heat transfer fluid in each heat pipe undergoes the closed thermodynamic heat transfer cycle discussed earlier. Thus, the heat transfer cycle of the heat transfer fluid in the heat pipe 108 involves vaporization or boiling of the liquid phase of the fluid in the evaporator region 132 of the pipe by heat absorption from the heat source 102, flow of the resulting fluid vapor through the vapor flow path in the pipe to its condenser region 134, condensation of the vapor in the latter region by rejection of its latent heat of vaporization to the thermal load 106, and capillary return flow of the liquid condensate to the evaporator region through the capillary layer 124. The heat transfer fluid in the heat pipe 110 undergoes a similar closed thermodynamic cycle involving vaporization or boiling of the liquid phase of the fluid in the evaporator region 132 of the pipe by heat absorption from the heat source 102, flow of the resulting fluid vapor through the vapor path to the condenser region 134 of the pipe, condensation of the vapor in the condenser region by rejection of its latent heat of vaporization to the heat sink 112, and capillary return flow of the liquid condensate to the evaporator region through the capillary means 124 of the pipe. In the particular thermal generator illustrated, it is assumed that heat transfer from the heat pipes to the thermal load and heat sink occurs by conduction. In some applications, however, such heat transfer may occur by radiation.

It is now evident that during operation of thermal generator 100, thermal energy transfer from the heat source 102 to the thermal load 106 for heating the load occurs through the heat pipe 108. Heat pipe 110 serves to dissipate or transfer excess or waste heat from the heat source to the heat sink 112.

According to the present invention, the rate of useful heat transfer from the heat source 102 to the thermal load 106 is regulated by the thermal energy transfer control means 114 of the heat pipe 108. The rate of waste heat transfer from the heat source to the heat sink 112 is regulated by the heat transfer control means 116 of the heat pipe 110. Operation of the control means 114 in the heat pipe 108 involves internal pressurizing of the bellows 126 in the latter pipe through the control port 128 from a suitable pressure signal generator 136. This internal pressurizing of the bellows urges the corresponding pressure wall member 130 against the adjacent capillary layer 124 in the heat pipe to cover and pressurize the face of the liquid phase of the heat transfer fluid contained in the layer. Such pressurizing of the face is effective to regulate the boiling temperature of the liquid within the evaporator region 132 of the heat pipe 108, and, thereby, the rate of thermal energy transfer through the pipe. In this latter regard it is evident that varying pressure in the bellows 126 of the heat pipe 108 varies the pressure on the face of the liquid phase of the heat transfer fluid in the pipe and, thereby, the boiling temperature of the liquid and the rate of heat transfer through the pipe from the source 102 to the thermal load 106. The rate of thermal energy transfer from the heat source to the load may thus be regulated by applying an appropriate control pressure to the control pressure port 128 of the heat pipe 108. A constant rate of heat flow to the load may be maintained, under varying rates of heat inflow from the heat source to the heat pipe 108, by maintaining a constant pressure in the bellows. The control means 116 of the heat pipe 110 functions in a similar manner to regulate the rate of waste heat flow from the source 102 to the heat sink 112. In this case, however, the constant control pressure or spring force in the bellows 126 of the latter pipe serves to maintain a constant pressure on the face of the liquid phase of the heat transfer fluid in the latter pipe, and thereby, a constant liquid boiling point.

In regard to constant control pressure operation of the heat pipes 108, 110, it is evident that increasing heat inflow to the heat pipes from the heat source 102 will tend to increase the vapor pressure active on the exposed side of the baffle or pressure wall member 130 and, thereby, the pressure on and the boiling temperature of the liquid to reduce the vapor pressure. Diminishing vapor pressure will have the reverse effect. It is now evident, therefor, that the heat pipes 108, 110 may be controlled to provide the thermal generator 100 with an automatic temperature control or regulating action which conditions the generator to function as an effective constant temperature heat source for the load 106, even though the actual thermal energy generating means or source 102 of the generator produces a varying thermal energy output. Moreover, the rate of thermal energy transfer from the heat source 102 to the thermal load may be regulated by regulating the control pressure at the control port 128 of the heat pipe 108 to maintain the load at any desired temperature level. Conceivably, the generator may be equipped with means for sensing the temperature of the load and modulating the control pressure delivered to the heat pipe 108 in such a way as to automatically maintain the load at a desired constant temperature.

It is now obvious, therefore, that the invention herein described and illustrated is fully capable of attaining the objects and advantages preliminarily setforth.

The embodiments of the invention in which an exclusive property or privilege is claimed are defined as follows:

1. A heat pipe comprising:
   a hermetic casing having thermally conductive evaporator and condenser wall sections adapted to be disposed in heat transfer relation to a heat source and a heat sink, respectively, interior evaporator and condenser regions adjacent and disposed in heat transfer relation to said evaporator and condenser wall sections, respectively, and an interior vapor flow path communicating said regions;
   means within said casing for conducting liquid along a liquid flow path from said condenser region to said evaporator region;
   said casing containing a quantity of liquid heat transfer fluid and its vapor sufficient to maintain a substantial supply of said liquid fluid within said evaporator region, thereby to condition said heat pipe to transfer thermal energy from said heat source to said heat sink by a closed thermodynamic heat transfer cycle involving continuous vaporization of said liquid heat transfer fluid within said evaporator region by absorption of thermal energy from said heat source, continuous flow of the resulting fluid vapor through said vapor flow path from said evaporator region to said condenser region, continuous condensation of the fluid vapor within said condenser region by rejection of its latent heat of vaporization to said heat sink, and continuous return flow of the liquid condensate from said condenser region to said evaporator region through said liquid flow path, whereby during operation of said heat pipe said heat transfer fluid undergoes a continuous change from the liquid phase to the vapor phase within said evaporator region and from the vapor phase to the liquid phase within said condenser region; and
   control means for regulating the pressure of one fluid phase within one of said regions comprising a movable pressure wall on said casing having one side disposed in pressurizing relation with said one fluid phase and movable in one direction to reduce said phase pressure and in the opposite direction to increase said phase pressure, said phase pressure producing a force in said one direction on said pressure wall, means on said casing defining a hermetic control pressure chamber bounded in part by and exposed to the other side of said pressure wall, and a control pressure signal generator communicating with said control chamber for maintaining in said control chamber a constant fluid pressure which may be selectively varied over a given range and maintained substantially constant at any selected level within said range, thereby to regulate the temperature at which the phase change of said heat transfer fluid occurs within said one region.

References Cited
UNITED STATES PATENTS

| | | | |
|---|---|---|---|
| 2,961,476 | 11/1960 | Maslin et al. | 174—15 |
| 3,330,130 | 7/1967 | Schraith et al. | 62—259 |
| 3,332,476 | 7/1967 | McDougal | 165—105 X |
| 2,026,423 | 12/1935 | Tiene | 165—105 X |
| 3,229,759 | 1/1966 | Grover | 165—105 |
| 3,243,613 | 3/1966 | Grover | 310—4 |

ROBERT A. O'LEARY, Primary Examiner

ALBERT W. DAVIS, Assistant Examiner

U.S. Cl. X.R.

62—514; 165—105